H. A. Henderson
Gate.

No. 75,756. Patented Mar. 24. 1868.

Witnesses
Henry Green
John G. Crocker

Inventor
Henry A Henderson
by Chas M Fray
his Atty

United States Patent Office.

HENRY A. HENDERSON, OF AVOCA, ASSIGNOR TO HIMSELF AND CHARLES M. GRAY, OF WHITESTOWN, NEW YORK.

Letters Patent No. 75,756, dated March 24, 1868.

IMPROVEMENT IN FARM-GATES.

The Schedule referred to in these Letters Patent and making part of the same.

TO ALL WHOM IT MAY CONCERN:

Be it known that I, HENRY A. HENDERSON, of Avoca, Steuben county, New York, have invented a new and useful Improvement in Farm-Gates; and I do hereby declare that the following is a full, clear, and exact description of my said invention, and of the mode of operation of the same, reference being had to the annexed drawings, making a part of this specification, in which—

Figure 1:
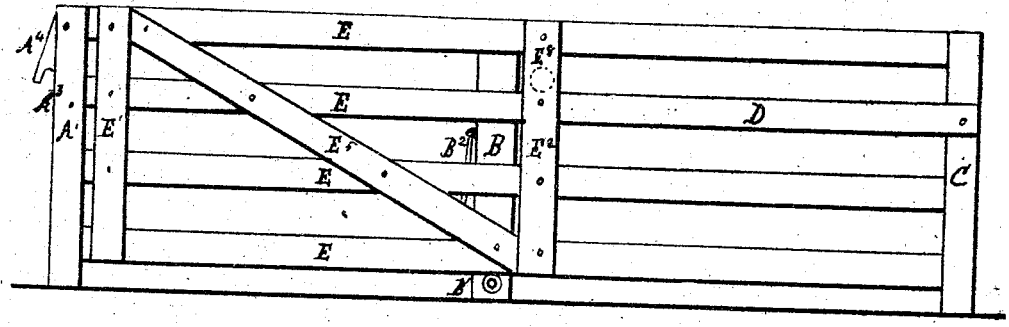
Figure 2:
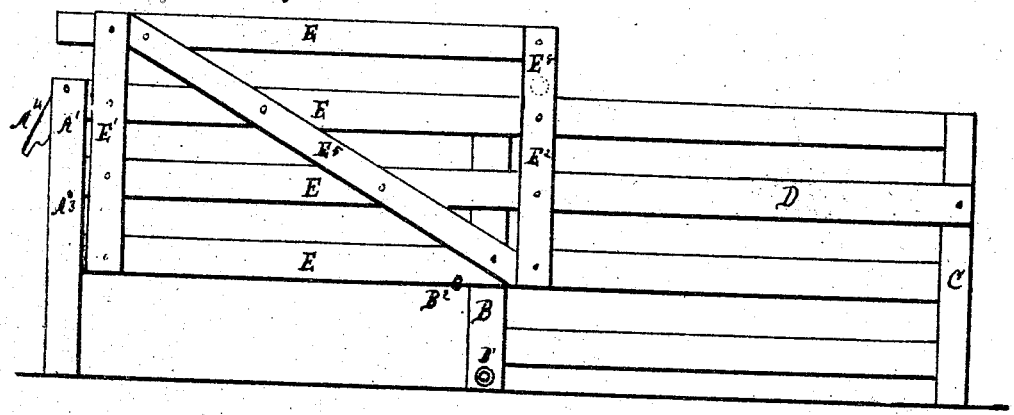

Figures 1 and 2 represent side views of the gate, and

Figure 3:
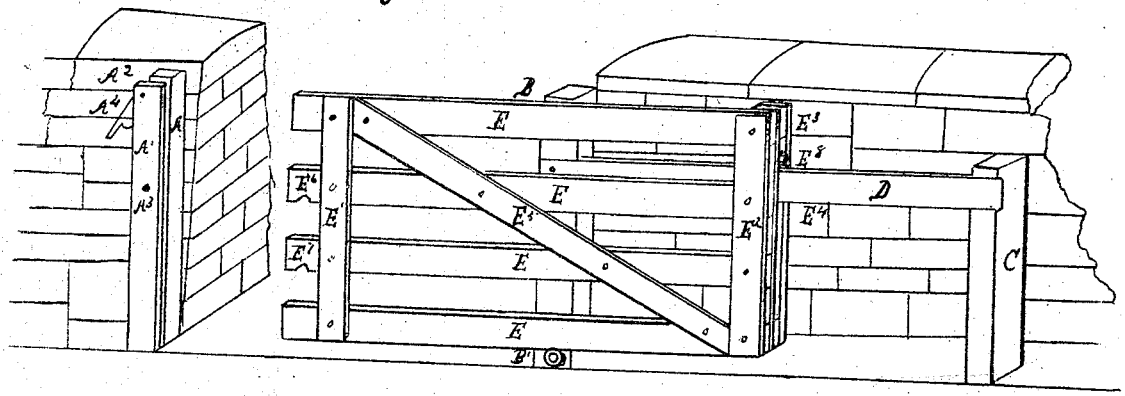

Figure 3 a perspective view thereof.

When a post-and-board fence is to be supplied with a gate, no gate-posts other than those of the fence are required.

The post A has a board, $A^1$, pinned or nailed to its face, with a space or slot, $A^2$, between, sufficient to allow the end of the gate to enter, as seen in fig. 3. A pin or bolt, $A^3$, passes through this board and into the post. In the slot $A^2$, above this pin, is a catch or stop, $A^4$, turning on a pin. The pin $A^3$ and catch $A^4$ serve to fasten the gate, as hereinafter described.

The post B has a small roller, $B^1$, on a level with the bottom board of the gate, and on the inner side a catch or hook, $B^2$. The roller serves to support the gate in opening and closing, and the hook is used to hold up the rear end of the gate when it is used as seen in fig. 2.

C is a second post of the fence. Extending from B to C, on the side opposite the fence-boards, is a guide-board, D, for guiding and keeping the gate in place, as hereinafter described.

The gate is composed of four or more bars or boards, E E E E. There is a cross-bar, $E^1$, near the front end. The rear end has a like cross-bar, $E^2$, on the front and back side, and on the back of the last one is another bar, $E^3$, so placed as to form with the middle one a slot, $E^4$, as seen in the drawing. The gate may also have a brace, $E^5$. The slot $E^4$ has a small roller, $E^8$, which runs on the guide-board D in operating the gate. The guide-board D is passed through this slot $E^4$. On the under side of two or more boards, E E, are cut notches $E^6$ and $E^7$. When the gate is to be shut and fastened, one or the other of the notches is placed on the pin $A^3$, and the catch or stop $A^4$ is turned down, and the gate is fastened. To unfasten it, the catch is turned up, and the end of the gate raised a little, and then it may be slipped back. The guide-board keeps it in place.

When snow has filled the road, or it is desired to raise the gate that sheep may pass out, and yet keep the cattle in the field or yard, the gate may be raised, the front part with the notch $E^7$ to the pin $A^3$, and the rear end is held up by the catch or hook $B^2$, as seen in fig. 2.

The advantages of this mode of construction are simplicity and cheapness. It may be made of the commonest materials, a few light boards and nails, by any one in the shortest time, and it is easily operated, and not likely to get out of repair.

Having thus described my invention, what I claim therein as new, and desire to secure by Letters Patent, is—

A farm-gate having the guide-board D, slot $E^4$, rolls $B^1$ and $B^8$, and the notches $E^6$ and $E^7$, and the hook $B^2$, in combination, for the uses and purposes mentioned.

HENRY A. HENDERSON.

Witnesses:
WM. R. HEAD,
J. M. CALKINS.